United States Patent [19]

Ko et al.

[11] Patent Number: 5,846,650
[45] Date of Patent: Dec. 8, 1998

[54] ANTI-REFLECTIVE, ABRASION RESISTANT, ANTI-FOGGING COATED ARTICLES AND METHODS

[75] Inventors: John H. Ko; Simon S. Fung, both of Woodbury, Minn.

[73] Assignee: Minnesota Mining and Manufacturing Company, St. Paul, Minn.

[21] Appl. No.: 644,136

[22] Filed: May 10, 1996

[51] Int. Cl.$^6$ ................................. B32B 7/10; B05D 5/06
[52] U.S. Cl. ........................... 428/336; 428/412; 428/421; 428/422; 428/442; 428/483; 351/41; 351/44; 351/49; 351/62; 351/159; 296/84.1; 427/162; 427/163.1
[58] Field of Search ............................... 428/36.91, 35.7, 428/35.2, 34.6, 34.7, 421, 422, 425.6, 423.1, 336, 483, 412, 442; 381/41, 44, 49, 62, 159; 296/84.1; 427/162, 163.1

[56] References Cited

U.S. PATENT DOCUMENTS

| | | | |
|---|---|---|---|
| 2,366,516 | 1/1945 | Geffcken et al. | 117/124 |
| 2,559,629 | 7/1951 | Berry | 260/408 |
| 2,732,398 | 1/1956 | Brice et al. | 260/503 |
| 2,803,552 | 8/1957 | Stedman | 106/13 |
| 3,022,178 | 2/1962 | Park et al. | 106/13 |
| 3,075,228 | 1/1963 | Ellas | 15/506 |
| 3,212,909 | 10/1965 | Leigh | 106/13 |
| 3,301,701 | 1/1967 | Baker et al. | 117/118 |
| 3,787,351 | 1/1974 | Olson | 260/40 R |
| 3,816,184 | 6/1974 | Redmore et al. | 148/6.15 |
| 3,819,522 | 6/1974 | Zmoda et al. | 252/89 |
| 3,833,368 | 9/1974 | Land et al. | 96/3 |
| 3,864,132 | 2/1975 | Rasch et al. | 96/85 |
| 3,897,356 | 7/1975 | Pociluyko | 252/91 |
| 3,940,359 | 2/1976 | Chambers | 260/29.6 F |
| 4,094,911 | 6/1978 | Mitsch et al. | 260/615 A |
| 4,190,321 | 2/1980 | Dorer et al. | 350/165 |
| 4,235,638 | 11/1980 | Beck et al. | 106/287.12 |
| 4,264,707 | 4/1981 | Uozumi et al. | 430/275 |
| 4,271,210 | 6/1981 | Yoldas | 427/169 |
| 4,273,826 | 6/1981 | McCollister et al. | 428/304 |
| 4,340,276 | 7/1982 | Maffitt et al. | 350/164 |
| 4,344,860 | 8/1982 | Plueddemann | 252/389 R |
| 4,346,131 | 8/1982 | Yoldas | 428/35 |
| 4,370,255 | 1/1983 | Plueddemann | 252/389 A |
| 4,374,158 | 2/1983 | Taniguchi et al. | 427/41 |
| 4,409,285 | 10/1983 | Swerdlow | 428/332 |
| 4,467,073 | 8/1984 | Creasy | 525/127 |
| 4,478,909 | 10/1984 | Taniguchi et al. | 428/331 |
| 4,505,997 | 3/1985 | Armand et al. | 429/192 |
| 4,610,955 | 9/1986 | Chen et al. | 430/527 |
| 4,657,805 | 4/1987 | Fukumitsu et al. | 428/215 |
| 4,719,146 | 1/1988 | Hohage et al. | 428/331 |
| 4,816,333 | 3/1989 | Lange et al. | 428/331 |
| 4,818,801 | 4/1989 | Rice et al. | 526/247 |
| 4,944,294 | 7/1990 | Borek, Jr. | 128/206.19 |
| 5,021,091 | 6/1991 | Takarada et al. | 106/287.16 |
| 5,021,308 | 6/1991 | Armand et al. | 429/194 |
| 5,139,879 | 8/1992 | Aharoni et al. | 428/422 |
| 5,204,219 | 4/1993 | Van Ooij et al. | 430/272 |
| 5,242,887 | 9/1993 | Usui | 503/227 |
| 5,324,543 | 6/1994 | Ogawa et al. | 427/387 |

FOREIGN PATENT DOCUMENTS

| | | |
|---|---|---|
| 0 300 661 | 7/1988 | European Pat. Off. . |
| 0 278 060 | 8/1988 | European Pat. Off. . |
| 0 372 756 | 6/1990 | European Pat. Off. . |
| 0 522 990 | 1/1993 | European Pat. Off. . |
| 0 522 990 A1 | 1/1993 | European Pat. Off. . |
| 61-053038 | 3/1986 | Japan . |
| 62-129366 | 6/1987 | Japan . |
| 63-014141 | 1/1988 | Japan . |
| 63-179966 | 7/1988 | Japan . |
| 2022342 | 1/1990 | Japan . |
| 2022343 | 1/1990 | Japan . |
| 2022344 | 1/1990 | Japan . |
| Hei 5-59300 | of 1993 | Japan . |
| Hei 5-59203 | 3/1993 | Japan . |
| Hei 6-41335 | 2/1994 | Japan . |
| WO 89/10106 | 11/1989 | WIPO . |

OTHER PUBLICATIONS

Cathro, K., et al., Silica Low–Reflection Coatings for Collector Covers, by a Dip–Coating Process, *Solar Energy*, vol. 32, No. 5, pp. 573–579 (1984).

Masso, J., Evaluation of Scratch Resistant and Antireflective Coatings for Plastic Lenses, Society of Vacuum Coaters, Proceedings of the 32nd Annual Technical Conference, Apr. 24–28, 1989, Copyright 1989, Society of Vacuum Coaters.

Trotoir, J.P., "Antifog/antistat eases processing problems," *Modern Plastics*, Oct. 1988.

Bragg, W.L. et al., "The Form Birefringence of Macromolecules," *Acta Cryst.* (1953) 6, pp. 865–867.

ASTM Test Method D1003–92, entitled "Standard Test Method for Haze and Luminous Transmittance of Transparent Plastics" (Reapproved 1988).

Product literature—"Fluorad™, Fluorochemical Specialties, Fluorad Lithium Trifluoromethanesulfonimide Battery Electrolyte HQ–115," 3M Industrial Chemical Products Division, May 1992.

Product literature—"Fluorad™, Fluorochemical Surfactants, Fluorad™ Fluorochemical Surfactant FC–127," 3M Industrial Chemical Products Division, Mar. 1987.

Milwidsky, B., "Non–Conventional Surface Active Agents," *Household & Personal Products Industry* (1981).

Product literature—"AGAFAR™ Adjustable Fli–Up Face Shields," Infection Control Products, Inc. (1993).

(List continued on next page.)

*Primary Examiner*—S. Mark Clardy
*Assistant Examiner*—Michael A. Williamson
*Attorney, Agent, or Firm*—F. Andrew Ubel

[57] ABSTRACT

An article comprising substrate having a surface and a coating on the surface of the substrate, the coating comprising a fluoropolymer and a fluorochemical surfactant. The fluoropolymer and the fluorochemical surfactant are selected such that the article is anti-reflective, abrasion resistant and anti-fogging. Methods of making the same are also described.

30 Claims, 4 Drawing Sheets

OTHER PUBLICATIONS

Product literature—Fluorad™ Coating Additives FC–430 and FC–431, 3M Industrial Chemical Products Division (Nov. 1989).

Technical Bulletin '"CYTOP" New Fluoropolymer', Asahi Glass Co., Ltd (1989).

Product Information literature, Cat. No. 9960 3M Antifog Optical Protection Film, 1994.

W.H. Buck and P. R. Resnick, Teflon AF Technical Information, Properties of Amorphous Fluoropolymers Based on 2,2–Bistrifluoromethyl–4,5–Difluoro–1,3–Dioxole (Oct. 1993).

THV Fluoroplastic Technical Information, THV 200 P, 3M Company (copyright unknown).

Michael and Irene Ash, *Handbook of Industrial Surfactants*, 1993, pp. 210–211.

ANTI-REFLECTIVE, ABRASION RESISTANT, ANTI-FOGGING COATED ARTICLES AND METHODS

FIELD

This invention relates to abrasion resistant, anti-reflective and anti-fogging coatings and to methods of coating optically clear articles, such as face shields, ophthalmic lenses, architectural glazings, windows, automotive windshields, or computer monitor screens.

BACKGROUND

There are numerous instances in which optically clear articles would be enhanced if they were resistant to abrasion and if the tendency of the articles to cause glare or to be obscured by the formation of a fog on a surface of the article could be reduced. Glare is the undesirable reflection of light from a surface upon which the light is incident. Protective eyewear (goggles, face shields, helmets, etc.), ophthalmic lenses, architectural glazings, decorative glass frames, motor vehicle windows and windshields, and computer monitor screens, may all reflect light in a manner that causes annoying and disruptive glare. The use of such articles may also be detrimentally affected by the formation of a moisture vapor fog on a surface of the article. For example, optically clear shields are used by healthcare professionals to prevent inadvertent contact with body fluids from patients. The use of such shields is limited, however, by glare, susceptibility to abrasion, and the formation of fog on the surface of the shield.

In general, glare may be reduced by increasing the amount of light transmitted by the article, thereby reducing the amount of light which is available for reflection. Alternatively, the article surface can be modified (e.g. roughened, embossed, etc.) to cause the light to be reflected from the article more randomly and, therefore, with less glare.

Coatings with both anti-reflective and anti-fogging properties have been made using organic metal oxides combined with small concentrations of anionic surfactants. These coatings, however, have very low abrasion resistance.

Coatings that significantly increase the percent transmission of light and provide articles having very low reflection are known in the art. For example, anti-reflective coatings of silica particles have been prepared, in which a coating composition contains colloidal silica particles and optionally a surfactant to improve the wettability of the coating composition. Other anti-reflective coatings use a gas phase treatment technique, wherein the coating may optionally contain additives as surface controlling agents, such as silicone type surfactants. None of these coatings, however, produces a durable, abrasion resistant coating. Another anti-reflective coating uses a layer of silica and a layer of fluorinated polymer to increase the abrasion resistance of the anti-reflective coating over that of the silica layer. None of these anti-reflective coatings have anti-fogging properties.

Anti-fogging is a desirable attribute in optically clear articles used in the aforementioned applications. In general, fog formation occurs under conditions of high humidity and high temperature or at interfacial boundaries where there is a large temperature and humidity difference. Coatings which reduce the tendency for surfaces to "fog up" (i.e., anti-fogging coatings) have been reported. Anti-fogging coatings improve the wettability of a surface, allowing a thin layer of water film to form on the surface instead of discrete droplets that lead to light scattering. Known anti-fogging coatings include, for example, coatings using ammonium soap, such as alkyl ammonium carboxylates in a mixture with a surface active agent which is a sulfated or sulfonated fatty material, to produce an anti-fogging composition, or the use of salts of sulfated alkyl aryloxypolyalkoxy alcohol, as well as alkylbenzene sulfonates, to produce an anti-fogging article useful in cleaning, and to impart anti-fog properties to various surfaces. Surfactant compositions comprising derivatives of decyne diol as well as surfactant mixtures which include ethoxylated alkyl sulfates have been used in an anti-fogging window cleaner surfactant mixture. None of these anti-fogging coatings, however, imparts anti-reflective properties, nor is any suitably abrasion resistant.

Anti-fogging coating films have been made having good abrasion resistance using polyvinyl alcohol, finely divided silica and an organic silicon compound with a hydrolysate capable of forming silanol by hydrolysis. These films, however, lack anti-reflective properties.

A coated, optically clear article that combines anti-reflective, anti-fogging, and abrasion resistance properties would thus be highly advantageous and desirable.

SUMMARY

The present invention overcomes the above-described disadvantages associated with currently available coatings for optically clear substrates. The present invention provides coated articles in which coatings are selected to impart anti-reflective and anti-fogging properties to the coated article with the additional and significant advantage that the coatings impart abrasion-resistance properties to the coated article. The coated articles of the present invention thus have application in numerous settings in which anti-reflective, abrasion resistance, and anti-fogging properties are desired.

Accordingly, the invention features an article comprising a substrate having a surface and coating on the surface of the substrate, in which the coating contains a fluoropolymer and a fluorochemical surfactant. The fluoropolymer comprises a tough, abrasion-resistant material when coated on the surface of the substrate, and the fluoropolymer and the fluorochemical surfactant are selected such that the coated article is anti-reflective, abrasion-resistant and anti-fogging.

In one embodiment of the present invention, the fluoropolymer comprises the cross-linked polymerization product of a polyether fluoropolymer having functional end groups available for cross-linking and at least one fluorinated ene-functional reactant. The polyether fluoropolymer may be selected from the group consisting of perfluoropolyether urethane dimethacrylates and perfluoropolyether diacrylates. The term "ene-functional reactant" refers to any reactant containing a polymerizable double bond, such as a reactant containing an acrylate moiety. The fluorinated ene-functional reactant may comprise fluorinated cyclohexyl methyl acrylate.

In another embodiment of the present invention, the fluoropolymer may comprise a blend of a thermoplastic fluoropolymer and the cross-linked polymerization product of one fluorinated ene-functional reactant. In this embodiment, the thermoplastic fluoropolymer may comprise, for example, a copolymer of tetrafluoroethylene, hexafluoropropylene, and vinylidene fluoride, and the fluorinated ene-functional reactant may comprise (per fluorocyclohexyl) methyl acrylate.

The article of the present invention may comprise a protective face shield or mask or other protective eyewear, a computer monitor screen, an ophthalmic lens, an automotive window or windshield, architectural glazings or the like.

In preferred embodiments of the present invention, the thickness on the coating of the substrate may be selected to provide anti-reflective properties with respect to visible light, ultraviolet radiation, or infrared radiation. The thickness of the coating is preferably about one quarter wavelength with respect to incident light. In preferred embodiments, the thickness of the coating on the surface is selected to be anti-reflective with respect to visible light, and the thickness of the coating preferably is between about 1000–2000 angstroms. In another preferred embodiment, the thickness of the coating is selected to be anti-reflective with respect to ultraviolet radiation, and the thickness of the coating preferably is between about 400–1000 angstroms. In another preferred embodiment, the thickness of the coating is selected to be anti-reflective with respect to infrared radiation, and the thickness of the coating preferably is between about 2000–2500 angstroms.

Preferred substrates for the article of the present invention include, polyethylene terephthalate, polycarbonate, high-refractive index glass, polyethylenenaphthalene, and the high refractive index acrylates. The coating may be present on one major surface of the substrate, or, alternatively, may be present on opposing major surfaces of the substrate.

In another embodiment, the coating may comprise a thermoplastic fluoropolymer, and the coating composition may further comprise an additional thermoplastic polymer (different from the thermoplastic fluoropolymer), in which the additional thermoplastic polymer is selected to enhance abrasion resistance of the coated article and to enhance adhesion of the coating to the surface of the substrate. An example of a suitable additional thermoplastic polymer is polymethyl methacrylate.

In other embodiments of the present invention, the fluorochemical surfactant may be excluded from the coating on the surface of the substrate. In these embodiments, the coating comprises one of the following: (1) the cross-linked reaction product of a polyether fluoropolymer having functional end groups available for cross-linking and at least one fluorinated ene-functional reactants; (2) a blend of a thermoplastic fluoropolymer and the cross-linked reaction product at least one fluorinated ene-functional reactants; or (3) a blend of a thermoplastic fluoropolymer and an additional thermoplastic polymer different from the thermoplastic fluoropolymer, where the additional thermoplastic polymer is selected to enhance abrasion resistance and adhesion of the coating to the surface of the substrate. In the latter ((3)), the coating is adjacent the surface of the substrate.

Preferably, the coated article of the invention exhibits improved light transmission at 500 nanometers of at least 2 percent compared with uncoated substrate, an Abrasion Test 2 score of about 10 cycles or greater, and an antifogging test score of 0.

In another aspect, the invention features a method of imparting anti-reflective, abrasion resistance, and anti-fogging properties to a substrate. The method includes the steps of:
  providing a substrate having a surface;
  providing a coating composition on the surface of the substrate, the coating composition containing a fluoropolymer and a fluorochemical surfactant; and
  causing the coating composition to harden on the surface of the substrate.

In embodiments of the method wherein the coating composition contains a cross-linkable material (such as the above-described polyether fluoropolymer and/or the fluorinated ene-functional reactant), the coating composition preferably contains a photoinitiator and the step of causing the coating composition to harden on the surface of the substrate comprises curing the coating composition on the surface of the substrate to produce the cross-linked reaction product.

In embodiments of the method of the present invention wherein the coating composition contains a blend of thermoplastic polymers, the step of causing the coating composition to harden on the surface of the substrate comprises drying the coating composition on the surface of the substrate.

In another aspect, the invention features a method of imparting anti-reflective and abrasion resistance properties to a substrate. The method involves the steps of providing a substrate having a surface, providing a coating composition on the surface of the substrate such that the coating composition is adjacent to the substrate, wherein the coating composition contains a fluoropolymer selected such that the substrate coated with the coating composition is anti-reflective and abrasion resistant, and causing the coating composition to harden on the surface of the substrate.

DESCRIPTION OF THE PREFERRED EMBODIMENTS

Figure 1:
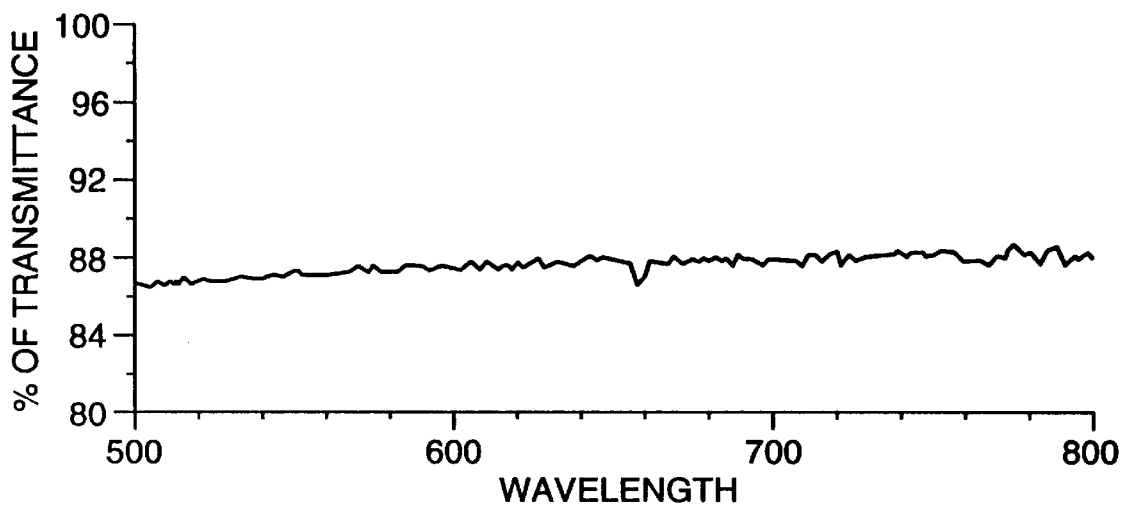
FIG. 1 is a graph depicting the percent light transmittance of an uncoated PET film (0.1016 mm thick) over a wavelength range of 500 to 800 nanometers.

The invention relates to coated, optically transparent articles in which the coating imparts anti-reflective, abrasion resistance, and anti-fogging properties to the article. Such coated articles have especially useful application as face shields or masks used for personal protection, windows, automotive windshields, architectural glazings, computer monitor screens, ophthalmic lenses, and any other application in which it is desirable to impart anti-reflective, abrasion resistance, and anti-fogging properties to an optically transparent article.

Accordingly, the invention relates in one preferred embodiment to an article having a surface and a coating on the surface of the substrate. The substrate may be any optically transparent material suitable for the intended application. Examples of suitable substrates for the article of the present invention include: polyethylene terephthalate (PET), polycarbonate, high refractive index glass, polyethylene naphthalene, and the high refractive index acrylates. Suitable substrate may also include multilayer polymeric film materials and may also include substrates containing primer coatings.

The coating on the surface of the substrate contains a fluoropolymer, and in preferred embodiments, a fluorochemical surfactant. The coating composition which includes the fluoropolymer and fluorochemical surfactant is selected to impart anti-reflective, abrasion resistance, and anti-fogging properties to the article.

A wide variety of fluoropolymer compositions are suitable for use in the present invention, and the fluoropolymer may be selected from among the many well-known and readily synthesizable fluoropolymers. Preferred fluoropolymers have low refractive indices (preferably in the range of about 1.3–1.4) and are soluble in one or more suitable solvents. Good adhesion of the fluoropolymer to the substrate is desirable, and the adhesion of a particular fluoropolymer or coating composition containing a fluoropolymer may be readily determined by routine procedures known to those of skill in the art.

More preferably, the coating contains a fluoropolymer from one of two major classes. One class is fluoropolymers having a CFR–CFR' linkage (where R and R' are fluorofunctional groups). An example of this class of fluoropolymers includes (1) a copolymer of tetrafluoroethylene, hexafluoropropylene, and vinylidene fluoride, or (2) perfluorocyclohexyl methyl acrylate ("THV Fluoroplastic," commercially available from 3M). Other examples include TEFLON AF, commercially available from DuPont, and CYTOP, commercially available from Asahi Glass.

A second major class is fluoropolymers with an ether linkage (perfluoropolyethers, or PPE), such as $CF_2O$ or $C_2F_4O$. The end groups of the PPE polymer chains typically, and preferably, have reactive functional groups available for cross-linking, such as acrylate, urethane methacrylate, silane, and isocyanate groups. Examples of this class of fluoropolymers include the perfluoropolyether urethane dimethacrylates (PPE-U-DiMA) and perfluoropolyether diacrylates (PPE-DiAc) The preparation of PPE-U-DiMA is described in U.S. Pat. No. 4,818,801 incorporated herein by reference. The preparation of PPE-DiAc is described in U.S. Pat. No. 4,094,911, incorporated herein by reference.

Suitable fluoropolymers have the desired refractive index and the desired abrasion resistance properties when applied to the surface of the substrate. Combinations of fluoropolymers with other agents (e.g., cross-linking agents and blended polymers) may also be employed to provide a coating having the desired properties in accordance with the invention. Combinations of fluoropolymers with other agents may be used, for example, where the fluoropolymer by itself does not achieve the desired abrasion resistance and/or have the desired refractive index, or where the fluoropolymer by itself does not have desirable adhesion to the surface of the substrate.

The following coating compositions are illustrative of such numerous possible combinations and represent preferred compositions for use in the invention.

In one preferred embodiment, the fluoropolymer in the coating comprises the cross-linked polymerization product of a polyether fluoropolymer having functional end groups available for cross-linking and at least one fluorinated ene-functional reactant. An "ene-functional reactant" is a reactant which contains a polymerizable double bond. An example of such a reactant is a reactant containing an acrylate moiety. The polyether may be one of those described above (e.g., PPE-U-DiMA or PPE-DiAc) and the fluorinated ene-functional reactant may be any of the fluorinated acrylates.

For example, fluorinated monoacrylates of the following general formula may be employed:

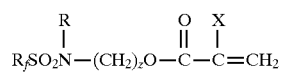

in which:

X is H or $CH_3$ $R_f$ represents a fluoro aliphatic radical, preferably $C_yF_{2y}+1$ in which y is an integer from 3 to 12, R represents an alkyl group, generally of 1 to 5 carbon atoms, and z is 1 or 2.

Specific examples of such compounds include: 2-(N-ethyl perfluoro octane sulphonamido) ethyl acrylate, 2-(N-ethyl perfluoro octane sulphonamido) ethyl methacrylate, and 2-(N-butyl perfluoro octane sulphonamido) ethyl acrylate.

Mixtures of two or more fluorinated mono-acrylates may also be employed.

The poly-functional cross-linking acrylates used in the invention are at least difunctional, preferably trifunctional or higher. The compounds generally have a molecular weight of less than 600.

Typical tri-functional (meth)acrylates have the general formula:

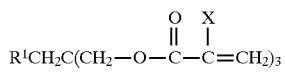

in which:

X is H or $CH_3$, and $R^1$ represents an alkoxy or alkyl group, generally of 1 to 5 carbon atoms (e.g. methyl), hydroxy, or —O—COC(X)$CH_2$ in which X is as defined above.

Suitable difunctional acrylates are of the general formula:

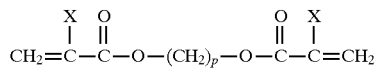

in which:

each X is H or $CH_3$ and p is an integer from 3 to 8.

Examples of cross-linking (meth)acrylates include: trimethylol propane tri(meth)acrylate, 1,4 butanediol di(meth) acrylate, 1,3 butanediol di(meth)acrylate, 1,6 hexanediol di(meth)acrylate, pentaerythritol tetra(meth)acrylate, hydantoin hexa acrylate, and (perfluorocyclohexyl) methyl (meth) acrylate.

Examples of preferred ene-functional reactants include (perfluorocyclohexyl) methyl acrylate and (perfluorocyclohexyl) methyl methacrylate.

In another preferred embodiment, the fluoropolymer may comprise a blend of a thermoplastic fluoropolymer and the cross-linked polymerization product of at least one ene-functional reactant. The thermoplastic fluoropolymer may be a member of the class described above having a CFR–CFR' linkage (e.g., THV), and the ene-functional reactant may be any of the fluorinated acrylates, but preferably is fluorinated cyclohexyl methyl acrylate.

In still another embodiment, the coating composition may comprise a blend of a thermoplastic fluoropolymer and an additional thermoplastic polymer different from the thermoplastic fluoropolymer. The thermoplastic fluoropolymer may be one of those described above, (e.g., THV). The additional thermoplastic polymer may be any thermoplastic polymer which is compatible (e.g., having appropriate refractive index, and exhibiting desirable optical properties when blended with the thermoplastic fluoropolymer) with the thermoplastic fluoropolymer and other components of the coating composition, and is selected, along with the thermoplastic fluoropolymer, to enhance the abrasion resistance of the coated article. The additional thermoplastic polymer may also be selected to enhance adhesion of the coating composition to the surface of the substrate. There are numerous possible thermoplastic polymers known in the art which may be suitable for use as the additional thermoplastic polymer. One preferred thermoplastic polymer which imparts the above-described advantages is polymethyl methacrylate.

In preferred embodiments of the present invention, the coating contains a fluorochemical surfactant which imparts anti-fogging properties to the coated article, in addition to the anti-reflective and abrasion resistance properties. Any fluorochemical surfactant which is soluble in the coating composition containing the fluoropolymer and which imparts anti-fogging properties to the coated article may be used. One preferred class of fluorochemical surfactant suitable for use in the present invention is the class of fluoroaliphatic oligomers described in U.S. Pat. No. 3,787,351, incorporated herein by reference. Other preferred classes of flurochemical surfactants for use in the invention include cationic fluorinated alkyl quaternary ammonium salts, and other nonionic and cationic fluorochemical surfactants marketed by 3M under the FLUORAD™ name.

In other embodiments of the invention, the coating does not include the fluorochemical surfactant. In these embodiments, the coatings are not selected to impart anti-fogging properties to the article, but to provide anti-reflective and abrasion resistance properties. These coatings may be used in applications where anti-fogging properties are not required or desired in the article.

The articles of the present invention may be anti-reflective with respect to visible light, ultraviolet light, or infrared radiation. Preferably, a single layer anti-reflective coating satisfies the following requirements: the refractive index of the coating should be about the square root of the refractive index of the substrate; and the coating should have an appropriate thickness. Where the coating is in contact with air, which has a refractive index of 1, and where the index of refraction of the coating material is about equal to the square root of the index of refraction of the substrate, the principles of optical physics dictate that surface reflection will be minimized if the thickness of the coating is about ¼ wavelength of incident light.

To achieve anti-reflective properties, the coating thickness thus is typically ¼ of the wavelength of the incident light. For example, for optimal performance, a coating thickness may be selected which is about ¼ of the midpoint of the spectrum of incident light. As used herein, the term "quarter wavelength" thickness refers to this principle, i.e. a thickness approximately ¼ of the midpoint wavelength of incident light. The coating thickness will thus vary depending on the wavelength of incident light in the application for which the coated article is prepared. Where anti-reflectivity with respect to visible light is desired, the coating is preferably between about 1000–2000 angstroms in thickness. Where anti-reflectivity with respect to ultraviolet radiation is desired, the coating is preferably between about 400–1000 angstroms in thickness.

Where anti-reflectivity with respect to infrared radiation is desired, the coating is preferably between about 2000–2500 angstroms in thickness. It should be recognized that the quarter wavelength principle may be applied to provide an anti-reflective coating of any appropriate thickness, depending on the wavelength range of incident light in a particular application.

The invention also relates to a method of imparting anti-reflective, abrasion resistance and anti-fogging properties to a substrate. The method involves the steps of:

providing a substrate having a surface;

providing a coating composition on the surface of the substrate, the coating composition comprising a fluoropolymer and a fluorochemical surfactant, the fluoropolymer and fluorochemical surfactant being selected such that the substrate coated with the coating composition is anti-reflective, abrasion resistant, and anti-fogging; and causing the coating composition to harden on the surface of the substrate.

To practice the method in one preferred embodiment, the fluoropolymers, any cross-linker (e.g., acrylate cross-linker) and initiator, fluorochemical surfactants (if an anti-fogging coating is used), and solvents are mixed thoroughly. If the coating composition is a blend of thermoplastic polymers (with or without fluorochemical surfactant) (no cross-linking reaction), then the coating composition is coated on to the substrate, using, for example, a coating rod, and then dried.

Where the coating is to be cured (i.e., cross-linking reaction), the formulations are prepared immediately prior to curing to avoid premature curing. The composition is coated on the substrate using a coating rod (e.g., a "Meyer" bar from R. D. Specialties, Rochester, N.Y.). The coated film is then UV-cured using a conveyor UV curing system (e.g., Lesbon Inc. UV Conveyor or RPC UV processor, Model 00120233 AN, Plainfield, Ill.). Another example of a coating and curing system is a Yasui Seiki Coater (Model 3-247, Kanagawa, Japan) with an R90 gravure roller. In this system, the coated web at 60 m/min is UV cured on a fusion system (model F600) with nitrogen purge.

The invention may be illustrated by way of the following examples.

EXAMPLE 1

Coating formulations were made by first dissolving "THV 200 P Fluoroplastic" composed of tetrafluoroethylene, hexafluoropropylene, and vinylidene fluoride in the form of powder (commercially available from 3M, St. Paul, Minn.) in methylethylketone (MEK) to make a 10 weight percent fluoroplastic solution. The fluoroplastic solution was then mixed with fluorinated cyclohexylmethyl acrylate (FCHA), trimethylol propane triacrylate (Tri-A), a photoinitiator and a fluorochemical surfactant. The amounts and types of compounds in the coating formulations are reported in Table 1a. The coating formulations were further diluted by adding 10 grams of MEK. The diluted formulations were coated on a 0.1016 mm corona-treated polyethylene terephthlate (PET) film using either a number 4 or number 6 Meyer bar (commercially available from R. D. Specialties, Webster, N.Y.). The coating thickness was controlled to about one-fourth (¼) of the optical wavelength of the incident light or approximately 1250 angstroms. The coated film was cured at a conveyer speed of 6.1 meters/minute using a UV Conveyor Coater from Lesbon Inc., Torrance, Calif. and a UV light source (F-300) manufactured by Fusion System from Rockville, Md. The coated films exhibited anti-reflective, anti-fogging and abrasion resistant properties as shown by evaluating them using five test methods: adhesion test, percent light transmittance, fog test, abrasion test 1, and refractive index.

Adhesion Test: The adhesion test determines how well the coating adhered to the film. A piece of 1.27 cm wide "SCOTCH™ Brand Number 810 Tape" was applied to the coated surface of the film. The tape was peeled and the surface of the coated film was observed for damage, such as delamination of the coating. A "NP" means that the coating remained attached to the film. A "P" means that the coating was removed from the film. The results are reported in Table 1b.

Figure 2:
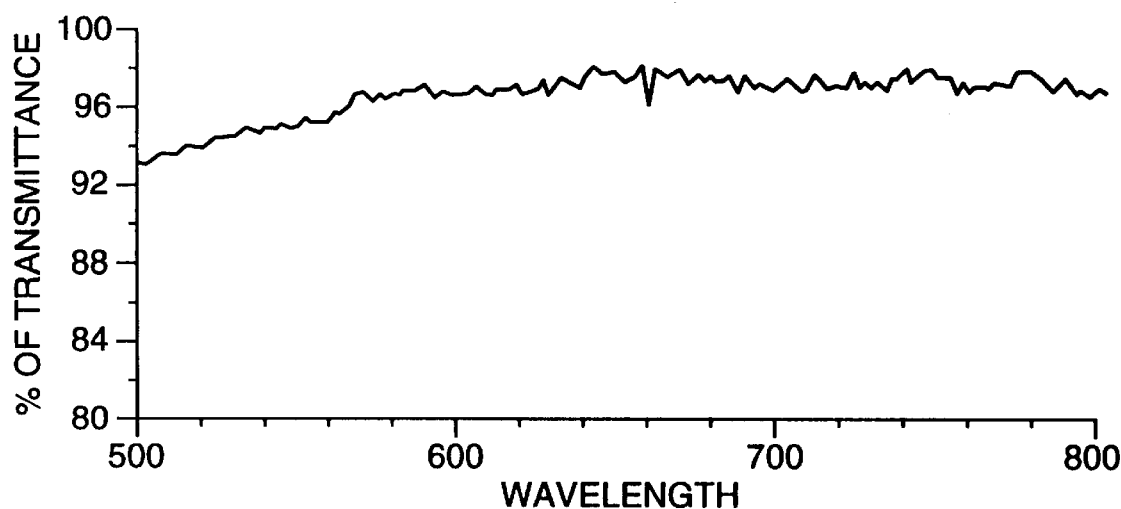
FIG. 2 is a graph depicting the percent light transmittance of PET film (0.1016 mm thick) coated on both sides with coating formulations as described in Example 1.

Percent Light Transmittance. The percent light transmittance determines the anti-reflective properties; that is, the higher the percent light transmitted by the coated films, the better the anti-reflective properties. The percent light transmittance was measured over a range of 500 nanometers to 800 nanometers using a "Hewlett-Packard Model 8452A UV/Visible Spectrophotometer" from Hewlett-Packard Company, Palo Alto, Calif. The results are shown in FIG. 1 for the uncoated PET film and FIG. 2 for a double coated PET film using the formulation from Run 1.

Fog Test. The fog test determines the anti-fog properties of the coated films. Individual coated film samples were passed through a steam source for approximately 1 second. The steam source was a container of boiling deionized water which was equipped with an inverted funnel that allowed the steam to exit approximately 10–13 cm above the liquid level through an opening which is approximately 1.3 cm in diameter. The steam temperature was approximately 40° C. The film sample was held approximately 5–8 cm above the steam exit. The level of fogging was determined by measuring the percent light transmittance over a range of 550 nanometers to 750 nanometers wavelength after exposure to the steam source (fog). The results were classified using the following rating scale: "0" means that the percent light transmittance is greater than 80% for the entire range of wavelengths, "1" means percent light transmittance is greater than 60% and less than 80%, "2" means percent light transmittance is greater than 40% and less than 60%, and "3" means percent light transmittance is less than 40% or the same as an uncoated polyester film. The results are reported in Table 1b.

Abrasion Test 1: Abrasion test 1 determines the abrasion resistance of the coated films. A tissue (available as "KLEENEX™ Facial Tissues" from Kimberly-Clark, Rosewell, Ga.) was used to finger-rub with a light finger pressure the coated surface until the coating was removed from the film. The more rubs the coating can withstand the better the abrasion resistance of the coating. The number of rubs was counted and recorded in Table 1b.

Refractive Index: The refractive index of the coating formulations determines their usefulness as anti-reflective coatings. For a single layer coating the refractive index should be approximately equal to the square root of the refractive index of the substrate to be completely anti-reflective. For PET the refractive index is 1.67–1.74; therefore, the refractive index of the coating should be approximately 1.29–1.32. The refractive index was measured for the liquid formulations using a refractometer (available as "#334610" from Milton Roy Company, Rochester, N.Y.).

TABLE 1a

| | Coating Formulation | | | | | |
|---|---|---|---|---|---|---|
| Run Number | THV[1]/ MEK (g) | FCHA[2] (g) | Tri-A[3] (g) | Photoinitiator[4] (g) | Fluoro-chemical surfactant[5] (g) | Meyer Bar Number |
| 1  | 6.000 | 1.500 | 0.150 | 0.150 | 0.180 | 4 |
| 2a | 6.000 | 1.500 | 0.150 | 0.150 | 0.220 | 4 |
| 2b | 6.000 | 1.500 | 0.150 | 0.150 | 0.220 | 6 |
| 3  | 6.000 | 1.500 | 0.150 | 0.150 | 0.270 | 6 |
| 4a | 6.000 | 1.750 | 0.175 | 0.150 | 0.200 | 4 |
| 4b | 6.000 | 1.750 | 0.175 | 0.150 | 0.200 | 6 |
| 5a | 6.000 | 1.750 | 0.175 | 0.150 | 0.250 | 4 |
| 5b | 6.000 | 1.750 | 0.175 | 0.150 | 0.250 | 6 |
| 6a | 6.000 | 1.750 | 0.175 | 0.150 | 0.300 | 4 |
| 6b | 6.000 | 1.750 | 0.175 | 0.150 | 0.300 | 6 |
| 7a | 6.000 | 2.000 | 0.200 | 0.150 | 0.220 | 4 |
| 7b | 6.000 | 2.000 | 0.200 | 0.150 | 0.220 | 6 |
| 8a | 6.000 | 2.000 | 0.200 | 0.150 | 0.270 | 4 |
| 8b | 6.000 | 2.000 | 0.200 | 0.150 | 0.270 | 6 |
| 9a | 6.000 | 2.000 | 0.200 | 0.150 | 0.330 | 4 |
| 9b | 6.000 | 2.000 | 0.200 | 0.150 | 0.330 | 6 |

[1]"THV 200 P Fluoroplastic" available from 3M, St. Paul, MN.
[2]FCHA refers to fluorinated cyclohexylmethyl acrylate available as "L-11619" from 3M.
[3]trimethylol propane triacrylate (Tri-A) from Aldrich Chemical Company, Milwaukee, WI.
[4]"IRGACURE ™ 907" available from Ciba-Geigy Corporation, Hawthorne, NY.
[5]"FLUORAD ™ FC-135" from 3M.

TABLE 1b

| Run Number | Adhesion Test | Fog Test | Abrasion Test 1 (number of rubs) |
|---|---|---|---|
| 1  | NP | 0 | 150 |
| 2a | NP | 0 | 85 |
| 2b | NP | 0 | 90 |
| 3  | NP | 0 | 250 |
| 4a | NP | 0 | 150 |
| 4b | NP | 0 | 50 |
| 5a | NP | 0 | 130 |
| 5b | NP | 0 | 40 |
| 6a | NP | 0 | 300 |
| 6b | NP | 0 | 30 |
| 7a | NP | 0 | 420 |
| 7b | NP | 0 | 30 |
| 8a | NP | 0 | 150 |
| 8b | NP | 0 | 30 |
| 9a | NP | 0 | 100 |
| 9b | NP | 0 | 100 |

The coated films had good adhesion, excellent anti-fog properties and excellent abrasion resistance. Some of the coatings survived over 100 rubs with a tissue. The percent transmittance of uncoated PET film was improved from about 87–88% (FIG. 1) to about 95–97% (FIG. 2) when both sides of the film were coated with the formulations. The refractive index of the liquid formulation without MEK was 1.38.

EXAMPLE 2

Coating formulations were made by first dissolving "THV 200 P Fluoroplastic" in MEK to make a 10 weight percent fluoroplastic solution. The fluoroplastic solution was then mixed with FCHA, Tri-A, and a photoinitiator. Table 2 contains the amounts and types of compounds used in the coating formulations. The coating formulations were diluted by adding 10 grams of MEK. The diluted formulations were coated using a number 4 Meyer bar and cured as described in Example 1. The coated films were evaluated using three tests described in Example 1: adhesion test, fog test, and abrasion test 1. The results are reported in Table 2a.

TABLE 2a

| Run Number | Formulation | | | | Results | | |
|---|---|---|---|---|---|---|---|
| | THV[1]/ MEK (g) | FCHA[2] (g) | Tri-A[3] (g) | Photo- initia- tor[4] (g) | Adhe- sion Test | Fog Test | Abrasion Test 1 (Number of rubs) |
| 1 | 6.000 | 1.500 | 0.150 | 0.15 | NP | 3 | 50 |
| 2 | 6.000 | 1.750 | 0.175 | 0.15 | NP | 3 | 250 |
| 3 | 6.000 | 2.000 | 0.200 | 0.15 | NP | 3 | 30 |

[1]"THV 200 P Fluoroplastic" available from 3M, St. Paul, MN.
[2]FCHA refers to fluorinated cyclohexylmethyl acrylate available as "L-11619" from 3M.
[3]trimethylol propane triacrylate (Tri-A) from Aldrich Chemical Company, Milwaukee. WI.
[4]"IRGACURE ™ 907" available from Ciba-Geigy Corporation, Hawthorne, NY.

The coatings had excellent adhesion to the PET film and excellent abrasion resistance. Since the fluorochemical surfactant was omitted from these formulations, the coated films did not have anti-fogging properties. The percent light transmittance was greater than 95 percent for all runs, and the refractive index of the liquid formulations before dilution with MEK was 1.38.

EXAMPLE 3

An anti-reflective coating formulation was made by dissolving "THV 200 P Fluoroplastic" in MEK to make a 10 weight percent solution. The formulation was coated using a microgravure attachment to a precision coater on a 0.013 mm thick PET film and cured as described in Example 1. The line speed was 6.1 meters per minute and the gravure speed was varied as reported in Table 3a.

In Run C7, a silica-sol coating was made for comparison of the anti-reflective properties. A silica sol (commercially available as "Remasol SP-30 Sodium Stabilized Silica Sol (30 percent solution)" from Remet Corp., Chadwicks, R.I.) was diluted with deionized water to a 1.75 weight percent dispersion. To 20 grams of the dispersion was added 0.3 grams of a fluorochemical surfactant (commercially available as "FLUORAD™ FC-95" potassium perfluoroalkyl sulfonate, an anionic surfactant from 3M) and 2 grams (0.17 weight percent) of a silane coupling agent, glycidoxypropyltrimethoxysilane (GPS) (commercially available as "A-187 GPS" from Union Carbide Chemical & Plastics Company, Danbury, Conn.). The formulation was coated on a 0.18 mm thick, flame treated, polyethylene terephthalate (PET) film using a roll coater with an air knife to adjust thickness. The coated film was immediately passed into a forced air drier at a temperature of 77° C. for less than 2 minutes of dwell time.

Run C6 and Run C8 were uncoated PET films 0.013 mm and 0.18 mm thick respectively.

The percent light transmission was measured as described in Example 1 for 500, 600, 700, and 800 nanometers. The results are reported in Table 3a and compared to the silica-sol coated PET film and to the two different thickness of uncoated PET film.

TABLE 3a

| Run Number | Gravure Speed (mpm) | Light Transmission (nanometers) | | | |
|---|---|---|---|---|---|
| | | 500 (%) | 600 (%) | 700 (%) | 800 (%) |
| 1 | 4.6 | 90.4 | 91.7 | 90.5 | 90.5 |
| 2 | 6.1 | 87.7 | 91.0 | 87.5 | 89.9 |
| 3 | 7.6 | 86.2 | 91.4 | 87.2 | 90.0 |
| 4 | 9.1 | 84.3 | 90.5 | 87.5 | 85.4 |
| 5 | 10.7 | 84.4 | 86.5 | 86.7 | 85.5 |
| C6 | — | 81.8 | 85.1 | 85.7 | 88.0 |
| C7 | — | 93.3 | 93.6 | 93.2 | 92.8 |
| C8 | — | 85.0 | 86.0 | 87.0 | 87.0 |

The percent light transmission of the uncoated PET film in Run C6 was improved with a one-side coating of 10% fluoroplastic in Run 1 at 600 nanometers from 85.1% to 91.7%.

EXAMPLE 4

Coating formulations were made by adding FLUORAD™ fluorochemical surfactants (available from 3M) to 6 grams of a 10 weight percent solution of fluoroplastic (available as "THV 200 P Fluoroplastic" from 3M). The amount and type of fluorochemical surfactant used is described in Table 4a. The formulations were coated using a number 4 Meyer bar and cured as described in Example 1. The coated films were evaluated using the fog test described in Example 1. The results are reported in Table 4a.

TABLE 4a

| Run Number | Fluorochemical Surfactant[1] Description | Fog Test Results at Various Levels of Fluorochemical Surfactant Concentration | | | |
|---|---|---|---|---|---|
| | | 10% | 5% | 2.5% | 1% |
| 1 | FLUORAD FC-120 ammonium perfluoroalkyl sulfonate ($C_{10}F_{21}SO_3^-NH_4^+$); anionic; 25% active in 37.5% 2-butoxyethanol, 37.5% water. | 3 | 3 | 3 | 3 |
| 2 | FLUORAD FC-129 [fn.2] potassium fluorinated alkyl carboxylate ($C_8F_{17}SO_2N(C_2H_5)CH_2CO^-_2K^+$); anionic; 50% active, 32% water, 14% 2-butoxyethanol, 4% ethanol. | — | — | — | — |
| 3 | FLUORAD FC-135 fluorinated alkyl quaternary ammonium iodide ($C_8F_{17}SO_2N(H)C_3H_6N^+(CH_3)_3I^-$); cationic; 50% active, 33% isopropyl alcohol (IPA), 17% water | 0 | 0 | 0 | 3 |
| 4 | FLUORAD FC-171 fluorinated alkyl alkoxylate ($C_8F_{17}SO_2N(C_2H_5)C_2H_4O(C_2H_4O)_{6.2}CH_3$); nonionic; 100% active. | 0 | 1 | — | 3 |
| 5 | FLUORAD FC-170C fluorinated alkyl POE ethanol ($C_8F_{17}SO_2N(C_2H_5)C_2H_4O(C_2H_4O)_{13}H$); nonionic; 95% active. | 1 | 3 | — | 3 |
| 6 | A 30/70 weight percent copolymer of $C_8F_{17}SO_2N(C_4H_9)C_2H_4OCOCH=CH_2$ and $HO(C_2H_4O)_{10}(C_3H_6O)_{22}(C_2H_4O)_{10}COCH=CH_2$. [fn.4 + 5] | 0 | 0 | — | 2 |
| 7 | A 30/70 weight percent copolymer of $C_8F_{17}SO_2N(C_2H_5)C_2H_4OCO(CH_3)=CH_2$ and $CH_3O(C_2H_4O)_{16}COCH=CH_2$. [fn.6] | 0 | 1 | — | 3 |

TABLE 4a-continued

| Run Number | Fluorochemical Surfactant[1] Description | Fog Test Results at Various Levels of Fluorochemical Surfactant Concentration | | | |
|---|---|---|---|---|---|
| | | 10% | 5% | 2.5% | 1% |
| 8 | A 30/70 weight percent copolymer of $C_8F_{17}SO_2N(C_2H_5)C_2H_4OCOC(CH_3) = CH_2$ and $C_{18}H_{37}OCOC)H_3)CH_2$.[fn. 7] | 0 | 0 | — | 3 |

[1]FLUORAD ™ Fluorochemical surfactants from 3M.
[2]The fluorochemical surfactant was insoluble in the fluoroplastic solution in MEK.
[3]A "—" indicates that no test was done.
[4]Acrylated diol (diol commercially available as Pluronic ™ L-44 from BASF Corp., Wyandotte, MI.
[5]Can be prepared using the procedure described in U.S. Pat. No. 3,787,351, Example 1.
[6]Can be prepared using the procedure described in U.S. Pat. No. 3,787,351, Example 2.
[7]Can be prepared using the procedure described in U.S. Pat. No. 3,787,351, Example 3, substituting mineral spirits for heptane.

The nonionic fluorochemical surfactants, Runs 6 and 8, and the cationic fluorochemical surfactant, FLUORAD™ FC-135, were more effective anti-fogging agents than the other fluorochemical surfactants used. The cationic fluorochemical surfactant, FLUORAD™ FC-135, was the most effective fluorochemical surfactant used. The films coated with the coating formulations of Runs 3 and 6 had a "0" result for the fog test after aging for 2 weeks at 49° C. with and without 90% relative humidity. Runs 5–8 had slightly hazy coatings at 10% fluorochemical surfactant concentration.

EXAMPLE 5

Coating formulations were prepared by dissolving perfluoropolyether urethane dimethacrylate (PPE-U-DiMA), FCHA, 1,1,5,5-tetrahydroperfluoropentyl 1,5-dimethacrylate (FDM) or polyperfluoroethylene glycol dimethacrylate (PPFGD) and a photoinitiator in 95 weight percent 1,1,2-trichloro-2,2,1-trifluroethane (commercially available as "FREON™ 113" from E. I. Du Pont de Nemours Company, Wilmington, Del.). The amounts of the active ingredients used for formulations in Runs 1–9 are reported in Table 5a. The coating formulations were coated using a number 4 Meyer bar and cured as described in Example 1 with the addition of a nitrogen purge during the curing process. The coated films were evaluated using abrasion test 1 and refractive index described in Example 1. The results are reported in Table 5a.

TABLE 5a

| | Formulation | | | | Results | |
|---|---|---|---|---|---|---|
| Run Number | PPE-U-DiMA[1] (g) | FCHA/ FDM[2] (g) | FCHA/ PPFGD[3] (g) | Photo-initiator[4] (g) | Abrasion Test 1 (number of rubs) | Refractive Index |
| 1 | 2.00 | 0.50 | 0.00 | 0.02 | 100 | 1.342 |
| 2 | 2.00 | 1.00 | 0.00 | 0.02 | 100 | 1.344 |
| 3 | 2.00 | 1.50 | 0.00 | 0.02 | >200 | 1.347 |
| 4 | 2.00 | 1.50 | 0.00 | 0.02 | NA[5] | 1.349 |
| 5 | 2.00 | 0.00 | 0.00 | 0.02 | 120 | 1.340 |
| 6 | 2.00 | 0.00 | 0.50 | 0.02 | 100 | 1.341 |
| 7 | 2.00 | 0.00 | 1.00 | 0.02 | 70 | 1.341 |
| 8 | 2.00 | 0.00 | 1.50 | 0.02 | 40 | 1.343 |
| 9 | 2.00 | 0.00 | 1.50 | 0.02 | 30 | 1.344 |

[1]Perfluoropolyether urethane dimethacrylate (PPE-U-DiMA) prepared as described in Example 1 of U.S. Pat. No. 4,818,801 incorporated herein by reference.
[2]10 parts fluorinated cyclohexylmethyl acrylate (FCHA)/1 part 1,1,5,5-tetrahydroperfluoropentyl 1,5-dimethacrylate (FDM) (commercially available from Monomer-Polymer DaJac Labs, Inc., Feasterville, PA).
[3]10 parts fluorinated cyclohexylmethyl acrylate (FCHA)/1 part polyperfluoroethylene glycol dimethacrylate (PPFGD).
[4]"DAROCURE ™ 1173" from Ciba-Geigy, Additive Division, Hawthorne, NY.
[5]"NA" means not available.

FDM was a better crosslinker than PPFGD for the PPE-U-DiMA fluoropolymer formulation as indicated by the increase in abrasion resistance.

EXAMPLE 6

Coating formulations were made by dissolving perfluoropolyether urethane dimethacrylate (PPE-U-DiMA), FCHA, and/or 1,1,5,5-tetrahydroperfluoropentyl 1,5-dimethacrylate (FDM) or Tri-A and/or hydroxyethylmethacrylate (HEMA), a photoinitiator, and a fluorochemical surfactant in 95 weight percent 1,1,2-trichloro-2,2,1-trifluroethane (commercially available as "FREON™113" from E.I. Du Pont de Nemours Company). The amounts of the active ingredients used for formulations in Runs 1–12 are reported in Table 6a. The formulations were coated on a PET film using a number 4 Meyer bar as described in Example 1. The coated film was cured using a high setting on a medium pressure mercury lamp at a web speed of 7.6 meters per minute on a UV Processor "Model 00120233 AN" from Radiation Polymer Company, Plainfield, Ill.

The coated films were evaluated using four tests described in Example 1: adhesion test, abrasion test 1, percent light transmittance, and fog test.

TABLE 6a

| Run Number | PPE-U-DiMA[1] (g) | FCHA/ FDM[2] (g) | FCHA/ Tri-A[3] (g) | HEMA/ Tri-A[4] (g) | Photoinitiator[5] (g) | Fluorochemical surfactant[6] (g) |
|---|---|---|---|---|---|---|
| 1 | 2.00 | 1.50 | 0.00 | 0.00 | 0.05 | 0.00 |
| 2 | 2.00 | 1.50 | 0.00 | 0.00 | 0.05 | 0.09 |
| 3 | 2.00 | 1.50 | 0.00 | 0.00 | 0.05 | 0.15 |
| 4 | 2.00 | 1.50 | 0.00 | 0.00 | 0.05 | 0.20 |
| 5 | 2.00 | 0.00 | 1.50 | 0.00 | 0.05 | 0.00 |
| 6 | 2.00 | 0.00 | 1.50 | 0.00 | 0.05 | 0.09 |
| 7 | 2.00 | 0.00 | 1.50 | 0.00 | 0.05 | 0.15 |
| 8 | 2.00 | 0.00 | 1.50 | 0.00 | 0.05 | 0.20 |
| 9 | 2.00 | 0.00 | 0.00 | 0.83 | 0.05 | 0.00 |
| 10 | 2.00 | 0.00 | 0.00 | 0.83 | 0.05 | 0.09 |

TABLE 6a-continued

| Run Number | PPE-U-DiMA[1] (g) | FCHA/ FDM[2] (g) | FCHA/ Tri-A[3] (g) | HEMA/ Tri-A[4] (g) | Photoinitiator[5] (g) | Fluorochemical surfactant[6] (g) |
|---|---|---|---|---|---|---|
| 11 | 2.00 | 0.00 | 0.00 | 0.83 | 0.05 | 0.15 |
| 12 | 2.00 | 0.00 | 0.00 | 0.83 | 0.05 | 0.20 |

[1]perfluoropolyether urethane dimethacrylate (PPE-U-DiMA) prepared as described in U.S. Pat. No. 4,818,801 Example 1.
[2]10 parts fluorinated cyclohexylmethyl acrylate (FCHA)/1 part 1,1,5,5-tetrahydroperfluoropentyl 1,5-dimethacrylate (FDM) (commercially available from Monomer-Polymer DaJac Labs, Inc.).
[3]10 parts fluorinated cyclohexylmethyl acrylate (FCHA)1 part trimethylol propane triacrylate (TRI-A).
[4]10 parts hydroxyethylmethacrylate( HEMA) (commercially available from Benz Research and Development, Sarasota, FL) /1 part trimethylol propane triacrylate (Tri-A).
[5]"DAROCURE ™ 1173" from Ciba-Geigy, Additives Division.
[6]"FLUORAD ™ FC-171" fluorinated alkyl alkoxylate; nonionic; 100% active from 3M.

The coated films exhibited anti-reflective, anti-fogging, and abrasion resistant properties. The adhesion test showed there was no delamination of the coating. The results of abrasion test 1 were similar to those obtained for Example 5.

Figure 3:
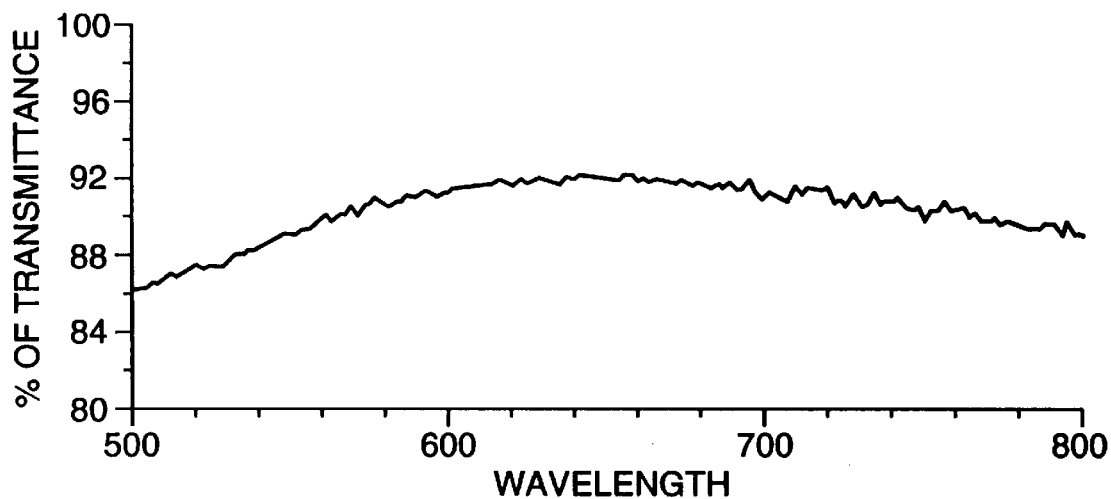
FIG. 3 is a graph depicting the percent light transmittance of PET film (0.1016 mm thick) coated on one side with coating formulations described in Example 6, Run 11.
Figure 4:
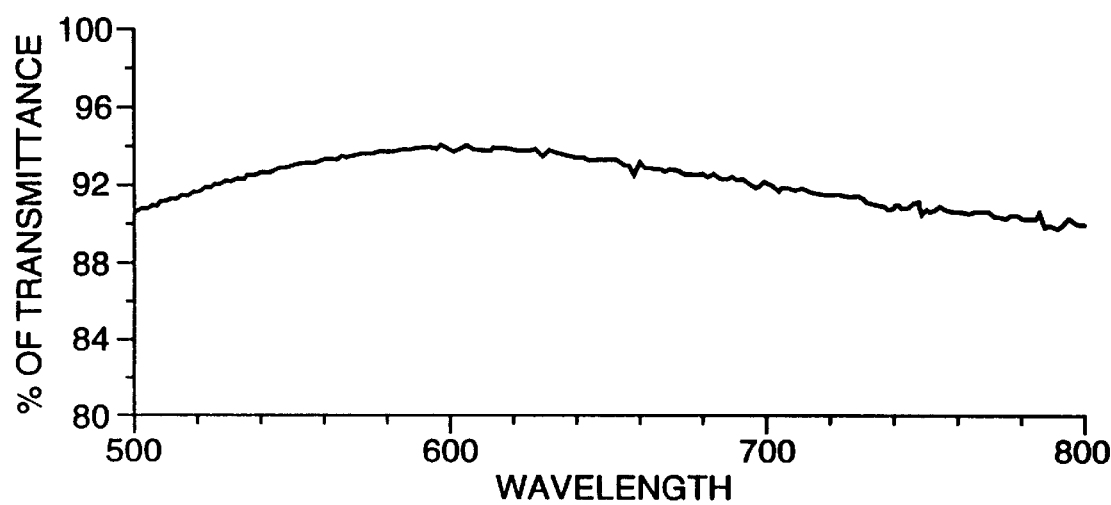
FIG. 4 is a graph depicting the percent light transmittance of PET film (0.1016 mm thick) coated on both sides with coating formulations described in Example 6, Run 11.

The percent light transmission increased from approximately 87% for an uncoated PET film (FIG. 1) to 91% for a one sided coating (FIG. 3) and 94% for a two sided coating (FIG. 4) at a wavelength of 600 nanometers.

EXAMPLE 7

Figure 5:
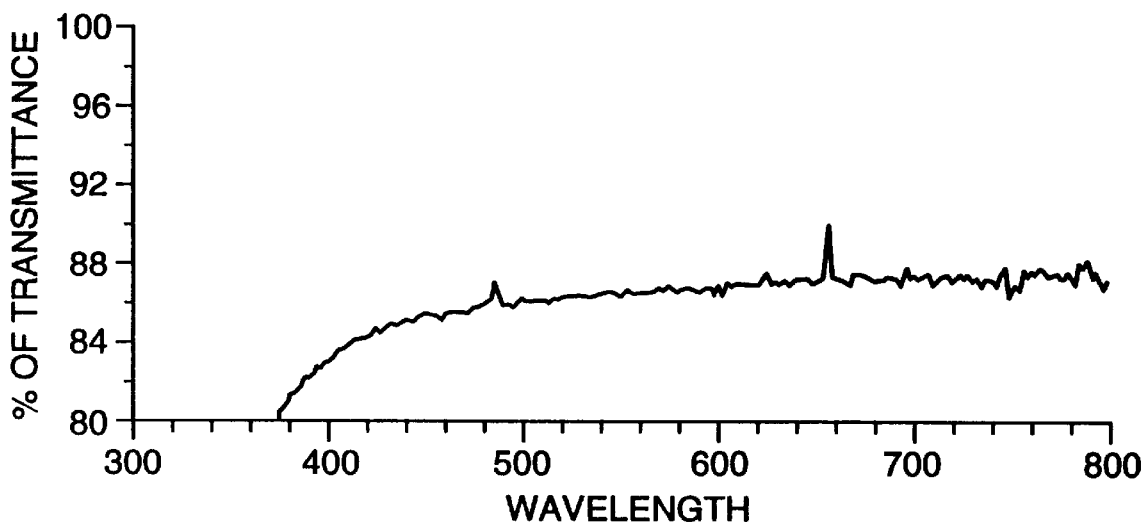
FIG. 5 is a graph depicting the percent light transmittance of an uncoated PET film (0.1016 mm thick) over a wavelength range of 300 to 800 nanometers.

Coating formulations were made using a replacement solvent for "FREON™113" 1,1,2-trichloro-2,2,1-trifluroethane. For Runs 1–3, perfluoropolyether diacrylate (PPE-DiAc) or for Runs 4–6, perfluoropolyether urethane dimethacrylate (PPE-U-DiMA ) was dissolved in a 1:1 weight ratio of a first fluorochemical surfactant to a 45:55 mixture of 3,3-dichloro-1,1,1,2,2-pentafluoropropane:1,3-dichloro-1,1,2,2,3-pentafluoropropane. A photoinitiator and a second fluorochemical surfactant were added to the formulation. The amounts of each active ingredient used in the formulations are reported in Table 7. The formulations were coated on a 0.1016 mm corona-treated PET film using a number 4 Meyer bar to render a coating thickness of approximately 1000 angstroms. The coated film was cured as described in Example 6 with a nitrogen purge. The coated films were evaluated using four tests as described in Example 1: abrasion test, fog test, refractive index and percent light transmission. The results are reported in Table 7a. The percent light transmission of the uncoated film is shown in FIG. 5 and for the coated film from Run 1 in FIG. 6.

TABLE 7a

| | Formulation | | | | | Results | | |
|---|---|---|---|---|---|---|---|---|
| Run Number | Fluoropolymer (g) | Solvent[3] (g) | Solvent[4] (g) | Photoinitiator[5] (g) | 2nd Fluorochemical surfactant[6] (g) | Abrasion Test 1 (Number of rubs) | Fog Test | Refractive Index |
| 1 | 0.500[1] | 5.000 | 5.000 | 0.020 | 0.000 | >50 | 3 | 1.323 |
| 2 | 0.500[1] | 5.000 | 5.000 | 0.020 | 0.025 | >50 | 0 | 1.323 |

TABLE 7a-continued

| | Formulation | | | | | Results | | |
|---|---|---|---|---|---|---|---|---|
| Run Number | Fluoropolymer (g) | Solvent[3] (g) | Solvent[4] (g) | Photoinitiator[5] (g) | 2nd Fluorochemical surfactant[6] (g) | Abrasion Test 1 (Number of rubs) | Fog Test | Refractive Index |
| 3 | 0.500[1] | 5.000 | 5.000 | 0.020 | 0.050 | >50 | 0 | 1.336 |
| 4 | 0.500[2] | 5.000 | 5.000 | 0.020 | 0.000 | >50 | 3 | — |
| 5 | 0.500[2] | 5.000 | 5.000 | 0.020 | 0.025 | >50 | 3 | — |
| 6 | 0.500[2] | 5.000 | 5.000 | 0.020 | 0.050 | >50 | 0 | 1.323 |

[1]perfluoropolyether diacrylate prepared as described in Example XIX of U.S. Pat. No. 4,094,911 incorporated herein by reference.
[2]perfluoropolyether urethane dimethacrylate prepared as described in Example 1 of U.S. Pat. No. 4,818,801.
[3]"FC-77" fluoro-containing solvent from 3M.
[4]"ASAHIKLIN AK-225" (a 45:55 mixture of 3,3-dichloro-1,1,1,2,2-pentafluoropropane:1,3-dichloro-1,1,2,2,3-pentafluoropropane) from Monomer-Polymer & Dajac Laboratories, Inc., Feasterville, PA.
[5]"DAROCURE ™ 1173" from Ciba-Geigy, Additives Division, Hawthorne, NY.
[6]"FLUORAD ™ FC-171" fluorinated alkyl alkoxylate; nonionic; l00% active from 3M.

Figure 6:
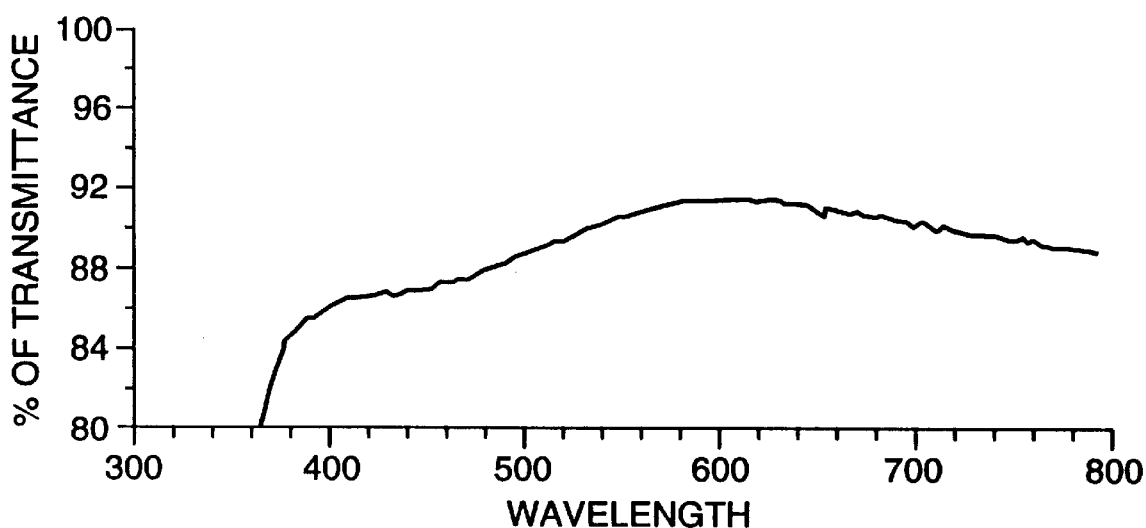
FIG. 6 is a graph depicting the percent light transmittance of PET film (0.1016 mm thick) coated on one side with coating formulations described in Example 7.

Anti-fogging was excellent for Runs 2,3 and 6 whose formulations contained the second fluorochemical surfactant. The percent light transmission increased from approximately 86% for an uncoated PET film at 600 nanometers as shown in FIG. 5 to approximately 91% for a one side coating from Run 1 at 600 nanometers as shown in FIG. 6.

EXAMPLE 8

Coating formulations were made by first dissolving "THV 200 P Fluoroplastic" in MEK to make a 10 weight percent solution. The fluoroplastic solution was then mixed with polymethylmethacrylate (PMMA) (commercially available as "ELVACITE 2043" from Rohm and Haas, Philadelphia, Pa.). For Run 1 the ratio of fluoroplastic to PMMA was 10:1 by weight and for Run 2 the ratio was 10:3 by weight. The coating formulations were coated on a PET film and dried as described in Example 1. The coated films were evaluated using abrasion test 2 described below.

ABRASION TEST 2

Figure 7:
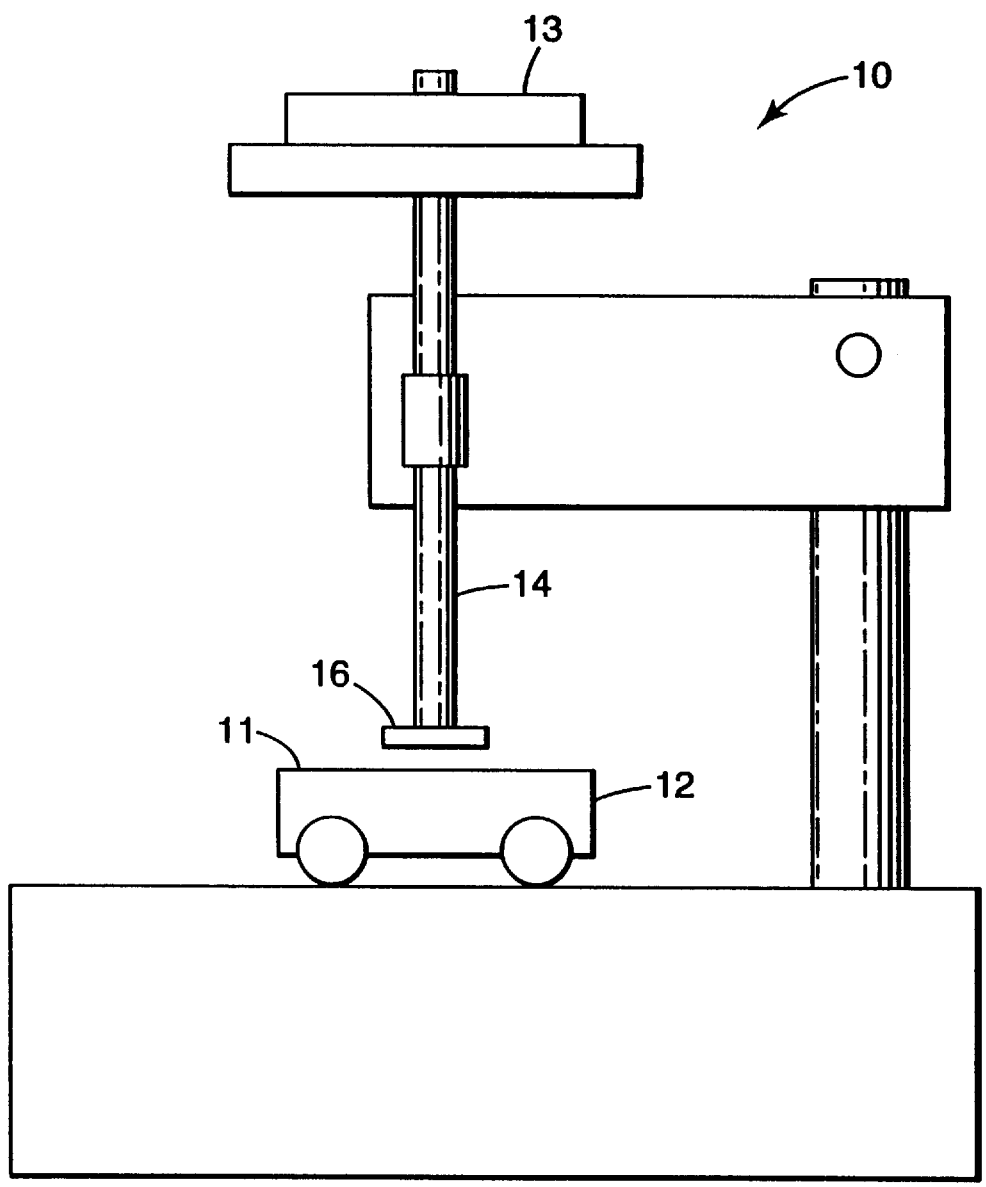
FIG. 7 is a schematic drawing of the Abrasion Tester used for Abrasion Test 2.

The abrasion tester (10) shown in FIG. 7 was used to evaluate abrasion resistance of samples from Examples 1, 3 and 8. The coated film (11) which was approximately 5 cm by 5 cm was placed on a cart (12) with a 3M double coated adhesive tape. A plunger (14) with a total weight (13) of 567 g on one end and an abrasive pad (16) (commercially available as "Buf-Puf™ Singles Regular Texture Sponge" from 3M) on the other end was placed with the pad on the coated film (11). The cart (12) was cycled back and forth for a distance of 2.54 cm at a rate of 4 cycles per second. A timer was used to time the cycles. At every 5 second interval the film surface was inspected for noticeable scratches and the number of cycles was recorded when the surface started to show visible scratches. Table 8a shows the results of several different coated films from other examples.

TABLE 8a

| Run Number | Description of Coated Film | Abrasion Test 2 (Number of cycles) |
|---|---|---|
| 1 | 10 parts fluoroplastic[1]/1 part PMMA[2] | 20 |
| 2 | 10 parts fluoroplastic[1]/3 parts PMMA[2] | 40 |
| Ex. 3 | Coated film from Example 3, Run 1 | 10 |
| Ex. 1 | Coated film from Example 1, Run 6 | 200 |
| Ex. 3 | Coated film from Example 3, Run C7 | <2 |

[2]"THV 200 P Fluoroplastic" composed of tetrafluoroethylene, hexafluoropropylene, and vinylidene fluoride in the form of powder commercially available from 3M.
[2]"ELVACITE 2043" from Rohm and Haas, Philadelphia, PA.

Abrasion resistance of the anti-reflective films can be improved by adding PMMA to the fluoroplastic. The more acrylate that was added in the coating, the more the abrasion resistance was improved.

EXAMPLE 9

Coating formulations were made by first dissolving "THV 200 P Fluoroplastic" in MEK to make a 10 weight percent fluoroplastic solution. Next "ACRYLOID™ B-44 Acrylic Resin" (commercially available from Rohm & Haas, Philadelphia, Pa.) was dissolved in MEK to make a 10 weight percent solution. Then the fluoroplastic solution was mixed with the acrylic resin solution and in Runs 4a–6d and 10a–12d a fluorochemical surfactant was added. The amounts of each ingredient are reported in Table 9a.

The coating formulations were coated using either a number 3, 4, 5, or 6 Meyer bar as described in Example 1.

Percent light transmittance, adhesion test, fog test and abrasion test 1 as described in Example 1 were used to evaluate the coated films. The results are reported in Table 9b for films coated on one side of the film and in Table 9c for films coated on both sides of the film. In Table 9c, the results of C6 and C7 are reported for comparison. C7 was prepared as described in Example 3 except the film was coated on both sides of the film. C6 is an uncoated PET film.

TABLE 9a

| Run Number | | THV[1]/MEK (g) | Acrylic Resin2/MEK (g) | Fluoro-chemical surfactant[3] (g) | MEK (g) | Concentration (% solids) | Meyer Bar Number |
|---|---|---|---|---|---|---|---|
| 1a, | 7a | 45.0 | 5.0 | 0.00 | 50.0 | 5.00 | 3 |
| 1b, | 7b | 45.0 | 5.0 | 0.00 | 50.0 | 5.00 | 4 |
| 1c, | 7c | 45.0 | 5.0 | 0.00 | 50.0 | 5.00 | 5 |
| 1d, | 75 | 45.0 | 5.0 | 0.00 | 50.0 | 5.00 | 6 |
| 2a, | 8a | 45.0 | 5.0 | 0.00 | 33.0 | 6.02 | 3 |
| 2b, | 8b | 45.0 | 5.0 | 0.00 | 33.0 | 6.02 | 4 |
| 2c, | 8c | 45.0 | 5.0 | 0.00 | 33.0 | 6.02 | 5 |
| 2d, | 8d | 45.0 | 5.0 | 0.00 | 33.0 | 6.02 | 6 |
| 3a, | 9a | 45.0 | 5.0 | 0.00 | 21.0 | 7.04 | 3 |
| 3b, | 9b | 45.0 | 5.0 | 0.00 | 21.0 | 7.04 | 4 |
| 3c, | 9c | 45.0 | 5.0 | 0.00 | 21.0 | 7.04 | 5 |
| 3d, | 9d | 45.0 | 5.0 | 0.00 | 21.0 | 7.04 | 6 |
| 4a, | 10a | 22.5 | 2.5 | 0.21 | 29.0 | 5.00 | 3 |
| 4b, | 10b | 22.5 | 2.5 | 0.21 | 29.0 | 5.00 | 4 |
| 4c, | 10c | 22.5 | 2.5 | 0.21 | 29.0 | 5.00 | 5 |
| 4d, | 10d | 22.5 | 2.5 | 0.21 | 29.0 | 5.00 | 6 |
| 5a, | 11a | 22.5 | 2.5 | 0.21 | 20.0 | 5.99 | 3 |
| 5b, | 11b | 22.5 | 2.5 | 0.21 | 20.0 | 5.99 | 4 |
| 5c, | 11c | 22.5 | 2.5 | 0.21 | 20.0 | 5.99 | 5 |
| 5d, | 11d | 22.5 | 2.5 | 0.21 | 20.0 | 5.99 | 6 |
| 6a, | 12a | 22.5 | 2.5 | 0.21 | 13.5 | 7.00 | 3 |
| 6b, | 12b | 22.5 | 2.5 | 0.21 | 13.5 | 7.00 | 4 |
| 6c, | 12c | 22.5 | 2.5 | 0.21 | 13.5 | 7.00 | 5 |
| 6d, | 12d | 22.5 | 2.5 | 0.21 | 13.5 | 7.00 | 6 |

[1]"THV 200 P Fluoroplastic" available from 3M, St. Paul, MN.
[2]"ACRYLOID ™ B-44 Acrylic Resin" available from Rohm & Haas, Philadelphia, PA.
[3]"FLUORAD ™ FC-135" from 3M.

TABLE 9b

| Run Number | Light Transmission (nanometers) | | | Adhesion Test | Fog Test | Abrasion Test 1 (Number of Rubs) |
|---|---|---|---|---|---|---|
| | 550 (%) | 650 (%) | 750 (%) | | | |
| 1a | 91.8 | 92.3 | 92.2 | NP | 3 | 100 |
| 1b | 91.6 | 90.9 | 88.5 | NP | 3 | 110 |
| 1c | 88.3 | 87.9 | 89.1 | NP | 3 | 100 |
| 1d | 91.9 | 92.0 | 91.4 | NP | 3 | 100 |
| 2a | 89.2 | 91.3 | 92.3 | NP | 3 | 140 |
| 2b | 89.2 | 87.5 | 88.3 | NP | 3 | 170 |
| 2c | 90.0 | 88.3 | 88.2 | NP | 3 | 75 |
| 2d | 90.9 | 87.6 | 88.0 | NP | 3 | 75 |
| 3a | 88.6 | 91.3 | 91.4 | NP | 3 | 165 |
| 3b | 87.5 | 89.0 | 90.1 | NP | 3 | 140 |
| 3c | 90.0 | 87.6 | 87.4 | NP | 3 | 85 |
| 3d | 89.7 | 91.8 | 89.4 | NP | 3 | 65 |
| 4a | 87.5 | 89.4 | 91.1 | NP | 0 | 10 |
| 4b | 88.6 | 90.7 | 92.0 | NP | 0 | 17 |
| 4c | 87.5 | 89.1 | 91.1 | NP | 0 | 12 |
| 4d | 91.4 | 89.3 | 88.4 | NP | 0 | 35 |
| 5a | 89.4 | 91.3 | 92.2 | NP | 0 | 15 |
| 5b | 87.8 | 89.9 | 91.6 | NP | 0 | 15 |
| 5c | 91.4 | 89.3 | 88.2 | NP | 0 | 17 |
| 5d | 89.6 | 92.2 | 90.6 | NP | 0 | 17 |
| 6a | 90.4 | 88.6 | 88.4 | NP | 0 | 15 |
| 6b | 87.7 | 88.1 | 89.5 | NP | 0 | 20 |
| 6c | 90.7 | 88.6 | 88.0 | NP | 0 | 22 |
| 6d | 91.6 | 91.2 | 89.1 | NP | 0 | 42 |

TABLE 9c

| Run Number | Light Transmission (nanometers) | | | Adhesion Test | Fog Test | Abrasion Test 1 (Number of Rubs) |
|---|---|---|---|---|---|---|
| | 550 (%) | 650 (%) | 750 (%) | | | |
| 7a | 91.1 | 92.9 | 94.7 | NP | 3 | 120 |
| 7b | 90.8 | 90.6 | 92.0 | NP | 3 | 110 |
| 7c | 94.5 | 90.0 | 92.0 | NP | 3 | 100 |
| 7d | 92.1 | 93.1 | 93.2 | NP | 3 | 80 |
| 8a | 91.4 | 93.3 | 95.3 | NP | 3 | 120 |
| 8b | 90.4 | 95.6 | 95.2 | NP | 3 | 100 |
| 8c | 92.1 | 92.6 | 93.7 | NP | 3 | 120 |
| 8d | 93.5 | 96.6 | 92.4 | NP | 3 | 70 |
| 9a | 89.7 | 90.3 | 92.6 | NP | 3 | 130 |
| 9b | 90.5 | 94.9 | 96.6 | NP | 3 | 130 |
| 9c | 89.8 | 92.6 | 95.8 | NP | 3 | 100 |
| 9d | 91.1 | 95.8 | 94.3 | NP | 3 | 100 |
| 10a | 92.0 | 95.1 | 96.7 | NP | 0 | 35 |
| 10b | 88.5 | 92.5 | 95.3 | NP | 0 | 55 |
| 10c | 92.4 | 91.1 | 90.6 | NP | 0 | 20 |
| 10d | 92.3 | 90.4 | 90.2 | NP | 0 | 20 |
| 11a | 93.7 | 96.5 | 97.3 | NP | 0 | 17 |
| 11b | 92.0 | 90.6 | 90.6 | NP | 0 | 13 |
| 11c | 92.5 | 89.1 | 88.8 | NP | 0 | 10 |
| 11d | 92.1 | 90.5 | 90.3 | NP | 0 | 12 |
| 12a | 89.2 | 92.6 | 95.2 | NP | 0 | 17 |

TABLE 9c-continued

| Run Number | Light Transmission (nanometers) | | | Adhesion Test | Fog Test | Abrasion Test 1 (Number of Rubs) |
|---|---|---|---|---|---|---|
| | 550 (%) | 650 (%) | 750 (%) | | | |
| 12b | 88.3 | 89.6 | 94.2 | NP | 0 | 10 |
| 12c | 88.6 | 90.4 | 93.1 | NP | 0 | 12 |
| 12d | 94.7 | 91.8 | 89.6 | NP | 0 | 9 |
| C6 | 85.9 | 86.5 | NA[1] | NA[1] | 3 | NA[1] |
| C7 | 96.7 | 96.6 | 95.6 | P | 0 | 7 |

[1]"NA" means "does not apply."

The coated films with the best abrasion resistance and highest percent light transmission were coated using a concentration of 5 or 6 percent solids and Meyer bar numbers of 3 or 4. The addition of fluorochemical surfactant made the coated films fog resistant, but reduced the abrasion resistance. The films which were coated on both sides had higher percent light transmission than those coated only on one side. Uncoated PET film C6 has lower light transmission, was not anti-reflective, nor anti-fogging. Run C7 was anti-reflective and anti-fogging, but the coating was not adhered well to the film and therefore had very low abrasion resistance.

EXAMPLE 10

Coating formulations were made as described in Example 9 except the ratio of "THV 200 P Fluoroplastic" and "ACRYLOID™ B-44 Acrylic Resin" was changed from 9:1 to 8:2 at concentrations of 5 and 6 percent solids. In Runs 3a–4d and 7a–8d, a fluorochemical surfactant was added. The formulations were coated using either a number 3 or 4 Meyer bar as described in Example 1. The amounts of each ingredient are reported in Table 10a. Percent light transmittance, adhesion test, fog test and abrasion test 1 as described in Example 1 were used to evaluate the coated films. The results are reported in Table 10b for films coated on one side of the film and in Table 10c for films coated on both sides of the film.

TABLE 10a

| Run Number | THV[1]/ MEK (g) | Acrylic Resin[2]/ MEK (g) | Fluoro-chemical Surfactant[3] (g) | MEK (g) | Concentration (% solids) | Meyer Bar Number |
|---|---|---|---|---|---|---|
| 1a | 20.0 | 5.0 | 0.00 | 25.0 | 5.00 | 3 |
| 1b | 20.0 | 5.0 | 0.00 | 25.0 | 5.00 | 4 |
| 2a | 20.0 | 5.0 | 0.00 | 16.5 | 6.02 | 3 |
| 2b | 20.0 | 5.0 | 0.00 | 16.5 | 6.02 | 4 |
| 3a | 20.0 | 5.0 | 0.21 | 25.0 | 5.00 | 3 |
| 3b | 20.0 | 5.0 | 0.21 | 25.0 | 5.00 | 4 |
| 4a | 20.0 | 5.0 | 0.21 | 16.5 | 5.99 | 3 |
| 4b | 20.0 | 5.0 | 0.21 | 16.5 | 5.99 | 4 |
| 5a | 20.0 | 5.0 | 0.00 | 25.0 | 5.00 | 3 |
| 5b | 20.0 | 5.0 | 0.00 | 25.0 | 5.00 | 4 |
| 6a | 20.0 | 5.0 | 0.00 | 16.5 | 6.02 | 3 |
| 6b | 20.0 | 5.0 | 0.00 | 16.5 | 6.02 | 4 |
| 7a | 20.0 | 5.0 | 0.21 | 25.0 | 5.00 | 3 |
| 7b | 20.0 | 5.0 | 0.21 | 25.0 | 5.00 | 4 |
| 8a | 20.0 | 5.0 | 0.21 | 16.5 | 5.99 | 3 |
| 8b | 20.0 | 5.0 | 0.21 | 16.5 | 5.99 | 4 |

[1]"THV 200 P Fluoroplastic" available from 3M, St. Paul, MN.
[2]"ACRYLOID ™ B-44 Acrylic Resin" available from Rohm & Haas, Philadelphia, PA.
[3]"FLUORAD ™ FC-l35" from 3M.

TABLE 10b

| Run Number | Light Transmission (nanometers) | | | Adhesion Test | Fog Test | Abrasion Test 1 (Number of Rubs) |
|---|---|---|---|---|---|---|
| | 550 (%) | 650 (%) | 750 (%) | | | |
| 1a | 88.6 | 88.6 | 89.9 | NP | 3 | 120 |
| 1b | 89.5 | 91.4 | 91.7 | NP | 3 | 105 |
| 2a | 88.6 | 89.5 | 90.4 | NP | 3 | 100 |
| 2b | 88.4 | 89.6 | 90.9 | NP | 3 | 150 |
| 3a | 90.4 | 90.9 | 89.5 | NP | 0 | 55 |
| 3b | 90.4 | 90.6 | 89.9 | NP | 0 | 35 |
| 4a | 88.7 | 89.4 | 89.9 | NP | 0 | 35 |
| 4b | 90.3 | 89.9 | 88.5 | NP | 0 | 25 |

TABLE 10c

| Run Number | Light Transmission (nanometers) | | | Adhesion Test | Fog Test | Abrasion Test 1 (Number of Rubs) |
|---|---|---|---|---|---|---|
| | 550 (%) | 650 (%) | 750 (%) | | | |
| 5a | 93.3 | 93.2 | 93.1 | NP | 3 | 110 |
| 5b | 92.2 | 92.2 | 92.7 | NP | 3 | 100 |
| 6a | 94.2 | 92.8 | 90.9 | NP | 3 | 100 |
| 6b | 92.2 | 94.5 | 93.8 | NP | 3 | 90 |
| 7a | 92.4 | 92.8 | 92.6 | NP | 0 | 22 |
| 7b | 91.4 | 91.5 | 92.2 | NP | 0 | 33 |
| 8a | 89.7 | 90.1 | 89.0 | NP | 0 | 25 |
| 8b | 93.0 | 93.8 | 93.0 | NP | 0 | 17 |

Changing the ratio of "THV 200 P Fluoroplastic" and "ACRYLOID™ B-44 Acrylic Resin" from 9:1 to 8:2 made the coating more uniform. The optimum coating conditions were using a number 4 Meyer bar with 6 weight percent solids concentration. The percent light transmittance at 650 nm increased from 85% for uncoated PET film to 94% for PET film coated on both sides. The percent light transmittance was slightly lower for the formulation with an 8:2 ratio than with the 9:1 ratio in Example 9. However, there was no change in the abrasion resistance of the two ratios of coating formulations.

EXAMPLE 11

Coating formulations were made by first dissolving "THV 200 P Fluoroplastic" in MEK to make a 10 weight percent fluoroplastic solution. Next "ACRYLOID™ A-11 Acrylic Resin" (commercially available from Rohm & Haas, Philadelphia, Pa.) was dissolved in MEK to make a 10 weight percent solution. Then the fluoroplastic solution was mixed with the acrylic resin solution to make weight solids ratios of 9:1, 8.5:1.5, and 8:2 fluoroplastic:acrylic resin. Next the solution was further diluted with MEK to a 5 or 6 weight percent solids solution. In Runs 7a–12b a fluorochemical surfactant was added to the solution. The amounts of each ingredient are reported in Table 11a. The coating formulations were coated using a number 3 or 4 Meyer bar as described in Example 1. Percent light transmittance, adhesion test, fog test and abrasion test 1 as described in Example 1 were used to evaluate the coated films. The results are reported in Table 11b for films coated on both sides.

TABLE 11a

| Run Number | THV[1]/ MEK (g) | Acrylic Resin[2]/ MEK (g) | Fluoro-chemical surfactant[3] (g) | MEK (g) | Concentration (% solids) | Meyer Bar Number |
|---|---|---|---|---|---|---|
| 1a | 45.0 | 5.0 | 0.00 | 50.0 | 5.00 | 3 |
| 1b | 45.0 | 5.0 | 0.00 | 50.0 | 5.00 | 4 |
| 2a | 45.0 | 5.0 | 0.00 | 33.0 | 6.02 | 3 |
| 2b | 45.0 | 5.0 | 0.00 | 33.0 | 6.02 | 4 |
| 3a | 43.5 | 7.5 | 0.00 | 51.0 | 5.00 | 3 |
| 3b | 43.5 | 7.5 | 0.00 | 51.0 | 5.00 | 4 |
| 4a | 43.5 | 7.5 | 0.00 | 34.0 | 6.00 | 3 |
| 4b | 43.5 | 7.5 | 0.00 | 34.0 | 6.00 | 4 |
| 5a | 40.0 | 10.0 | 0.00 | 50.0 | 5.00 | 3 |
| 5b | 40.0 | 10.0 | 0.00 | 50.0 | 5.00 | 4 |
| 6a | 40.0 | 10.0 | 0.00 | 33.0 | 6.02 | 3 |
| 6b | 40.0 | 10.0 | 0.00 | 33.0 | 6.02 | 4 |
| 7a | 45.0 | 5.0 | 0.41 | 57.0 | 5.04 | 3 |
| 7b | 45.0 | 5.0 | 0.41 | 57.0 | 5.04 | 4 |
| 8a | 45.0 | 5.0 | 0.41 | 39.0 | 6.05 | 3 |
| 8b | 45.0 | 5.0 | 0.41 | 39.0 | 6.05 | 4 |
| 9a | 43.5 | 7.5 | 0.41 | 58.0 | 5.04 | 3 |
| 9b | 43.5 | 7.5 | 0.41 | 58.0 | 5.04 | 4 |
| 10a | 43.5 | 7.5 | 0.41 | 40.0 | 6.03 | 3 |
| 10b | 43.5 | 7.5 | 0.41 | 40.0 | 6.03 | 4 |
| 11a | 40.0 | 10.0 | 0.41 | 58.0 | 4.99 | 3 |
| 11b | 40.0 | 10.0 | 0.41 | 58.0 | 4.99 | 4 |
| 12a | 40.0 | 10.0 | 0.41 | 40.0 | 5.98 | 3 |
| 12b | 40.0 | 10.0 | 0.41 | 40.0 | 5.98 | 4 |

[1]"THV 200 P Fluoroplastic" available from 3M, St. Paul, MN.
[2]"ACRYLOID ™ A-11 Acrylic Resin" available from Rohm & Haas, Philadelphia, PA.
[3]"FLUORAD ™ FC-l35" from 3M.

TABLE 11b

| Run Number | Light Transmission (nanometers) | | | Adhesion Test | Fog Test | Abrasion Test 1 (Number of Rubs) |
|---|---|---|---|---|---|---|
| | 550 (%) | 650 (%) | 750 (%) | | | |
| 1a | 93.4 | 96.3 | 97.2 | NP | 3 | 125 |
| 1b | 90.6 | 91.5 | 92.8 | NP | 3 | 160 |
| 2a | 88.6 | 90.6 | 91.0 | NP | 3 | 90 |
| 2b | 86.3 | 88.4 | 92.0 | NP | 3 | 120 |
| 3a | 92.2 | 95.4 | 96.9 | NP | 3 | 115 |
| 3b | 87.7 | 89.2 | 89.9 | NP | 3 | 90 |
| 4a | 90.4 | 93.1 | 94.9 | NP | 3 | 120 |
| 4b | 87.5 | 88.6 | 90.6 | NP | 3 | 110 |
| 5a | 92.8 | 96.0 | 97.4 | NP | 3 | 90 |
| 5b | 91.5 | 91.2 | 91.3 | NP | 3 | 105 |
| 6a | 94.1 | 96.8 | 97.8 | NP | 3 | 130 |
| 6b | 91.2 | 91.4 | 92.0 | NP | 3 | 110 |
| 7a | 92.3 | 95.4 | 96.4 | NP | 0 | 22 |
| 7b | 87.1 | 87.1 | 88.5 | NP | 0 | 30 |
| 8a | 93.0 | 95.8 | 96.8 | NP | 0 | 27 |
| 8b | 87.9 | 88.2 | 88.6 | NP | 0 | 40 |
| 9a | 89.5 | 90.3 | 91.3 | NP | 0 | 65 |
| 9b | 88.5 | 88.8 | 90.3 | NP | 0 | 60 |
| 10a | 93.5 | 96.0 | 96.8 | NP | 0 | 40 |
| 10b | 87.6 | 88.8 | 88.6 | NP | 0 | 40 |
| 11a | 93.5 | 94.7 | 95.9 | NP | 0 | 40 |
| 11b | 90.8 | 91.6 | 93.4 | NP | 0 | 45 |
| 12a | 91.4 | 92.3 | 93.6 | NP | 0 | 80 |
| 12b | 90.1 | 91.5 | 93.4 | NP | 0 | 65 |

The best results for anti-reflection, abrasion resistant (ARAB) films and anti-fogging, anti-reflection, abrasion resistant (AFARAB) films were obtained using a coating formulation with a solids ratio of 8:2 fluoroplastic:acrylic resin at a 6 weight percent solids concentration and a number 3 Meyer Bar.

What is claimed is:

1. An article comprising an optically transparent substrate having a surface and a coating on the surface of the substrate, said coating comprising a fluoropolymer and a fluorochemical surfactant, said fluoropolymer and fluorochemical surfactant being selected such that the coated article is anti-reflective, abrasion resistant and anti-fogging.

2. The article of claim 1 wherein the fluoropolymer comprises the cross-linked polymerization product of a polyether fluoropolymer having functional end groups available for cross-linking and at least one fluorinated ene-functional reactant.

3. The article of claim 2 wherein the polyether fluoropolymer is selected from the group consisting of perfluoropolyether urethane dimethacrylates and perfluoropolyether diacrylates, and wherein the fluorinated ene-functional reactant comprises fluorinated cyclohexyl methyl acrylate monomer.

4. The article of claim 1 wherein the fluoropolymer comprises a thermoplastic fluoropolymer and the cross-linked polymerization product of at least one fluorinated ene-functional reactant.

5. The article of claim 4 wherein the thermoplastic fluoropolymer comprises a copolymer of tetrafluoroethylene, hexafluoropropylene, and vinylidene fluoride, and wherein the fluorinated ene-functional reactant comprises fluorinated cyclohexyl methyl acrylate.

6. The article of claim 1 wherein the article comprises a face shield.

7. The article of claim 1 wherein the article comprises protective eyeglasses.

8. The article of claim 1 wherein the article comprises a computer monitor screen.

9. The article of claim 1 wherein the coating has a thickness of about one quarter wavelength with respect to incident visible light and a refractive index of about the square root of the refractive index of the substrate.

10. The article of claim 1 wherein the coating has a thickness of approximately 1000–2000 angstroms.

11. The article of claim 1 wherein the coating has a thickness of about one quarter wavelength with respect to incident ultraviolet radiation and a refractive index of about the square root of the refractive index of the substrate.

12. The article of claim 1 wherein the coating has a thickness of about 400–1000 angstroms.

13. The article of claim 1 wherein the coating has a thickness of about one quarter wavelength with respect to incident infrared radiation and a refractive index of about the square root of the refractive index of the substrate.

14. The article of claim 1 wherein the coating has a thickness of between about 2000–2500 angstroms.

15. The article of claim 1 wherein the substrate comprises polyethylene terephthalate film.

16. The article of claim 1 wherein the substrate comprises polycarbonate film.

17. The article of claim 1 wherein the substrate comprises a high refractive index glass.

18. The article of claim 1 wherein the fluoropolymer comprises a thermoplastic fluoropolymer, and the coating further comprises an additional thermoplastic polymer different from said thermoplastic fluoropolymer, said additional thermoplastic polymer being selected to enhance the abrasion resistance of the coated article and to enhance adhesion of the coating to the surface of the substrate.

19. The article of claim 18 wherein the additional thermoplastic polymer comprises polymethyl methacrylate.

20. The article of claim 1 wherein the coated article exhibits improved light transmission at 500 nanometers of at least 2 percent compared with uncoated substrate.

21. The article of claim 1 wherein the coated article exhibits an Abrasion Test 2 score of about 10 cycles or greater.

22. The article of claim 1 wherein the coated article exhibits an anti-fogging test score of 0.

23. A method of imparting anti-reflective, abrasion resistance, and anti-fogging properties to an optically clear substrate, the method comprising the steps of:

providing a substrate having a surface;

providing a coating composition on the surface of the substrate, the coating composition comprising a fluoropolymer and a fluorochemical surfactant; and causing the coating composition to harden on the surface of the substrate;

said fluoropolymer and fluorochemical surfactant being selected such that the substrate coated with the coating composition is anti-reflective, abrasion resistant, and anti-fogging.

24. The method of claim 23 wherein the fluoropolymer comprises a polyether fluoropolymer having functional end groups available for cross-linking, and wherein the coating composition further comprises at least one fluorinated ene-functional reactant.

25. The method of claim 24 wherein the coating composition comprises a photoinitiator and wherein the step of causing the coating composition to harden on the surface of the substrate comprises curing the coating composition on the surface of the substrate to produce a hardened coating on the surface of the substrate comprising the cross-linked polymerization product of the polyether fluoropolymer and at least one fluorinated ene-functional reactant.

26. The method of claim 23 wherein the fluoropolymer comprises a thermoplastic fluoropolymer.

27. The method of claim 26 wherein the coating composition further comprises at least one fluorinated ene-functional reactant.

28. The method of claim 27 wherein step of causing the coating composition to harden comprises curing the coating composition on the surface of the substrate to produce a coating on the surface of the substrate comprising the thermoplastic fluoropolymer and the cross-linked polymerization product of at least one fluorinated ene-functional reactant.

29. The method of claim 26 wherein the coating composition further comprises an additional thermoplastic polymer different from said thermoplastic fluoropolymer, said additional thermoplastic fluoropolymer being selected to enhance adhesion resistance of the coated article and to enhance adhesion of the coating to the surface of the substrate.

30. The method of claim 29 wherein step of causing the coating composition to harden on the surface of the substrate comprises drying the coating composition on the surface of the substrate.

* * * * *